UNITED STATES PATENT OFFICE.

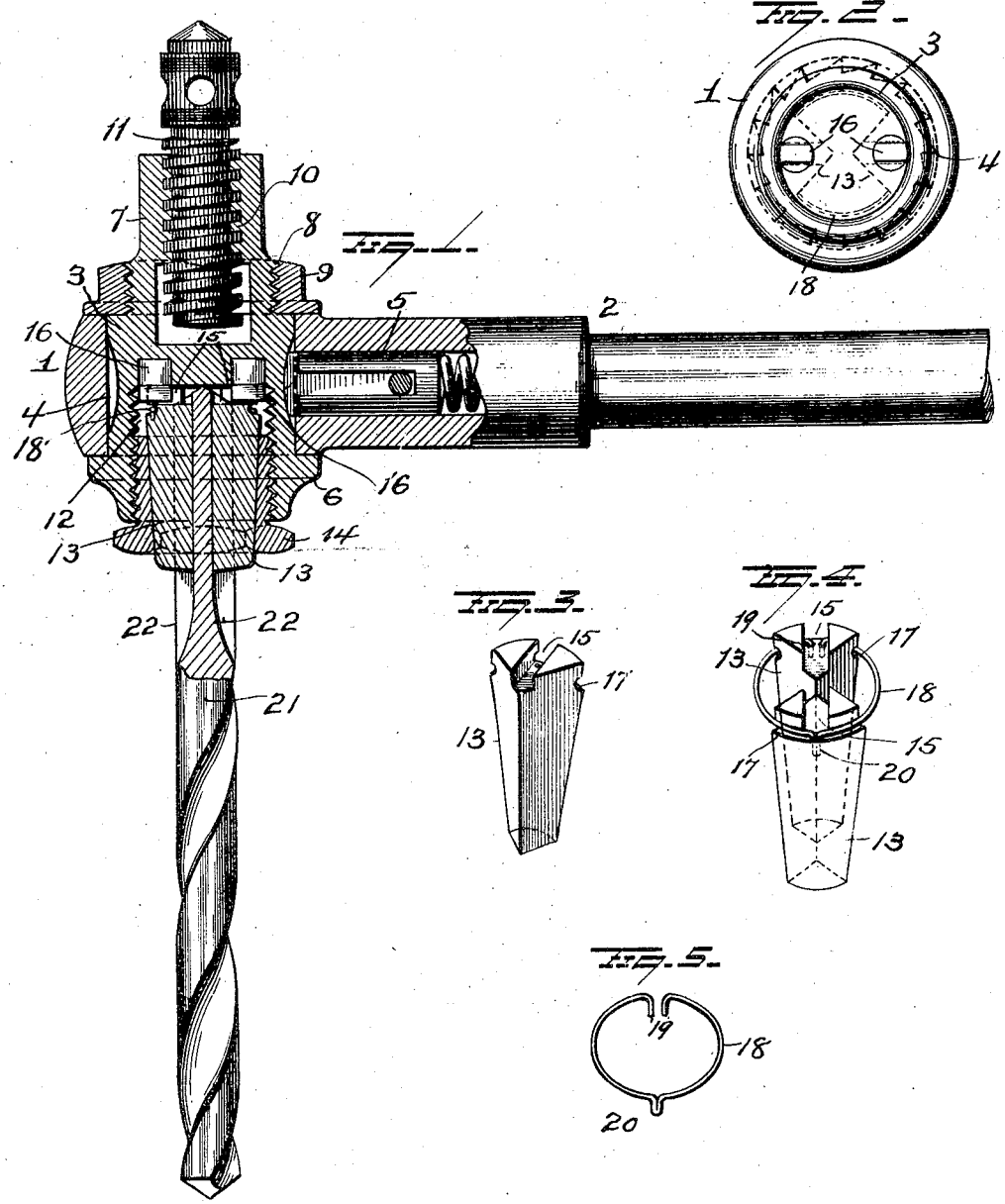

KARL V. JENSEN, OF MANISTEE, MICHIGAN, ASSIGNOR OF ONE-HALF TO WALTER S. THOMPSON, OF MANISTEE, MICHIGAN.

CHUCK.

1,069,430.  Specification of Letters Patent.  Patented Aug. 5, 1913.

Application filed December 23, 1912. Serial No. 738,338.

*To all whom it may concern:*

Be it known that I, KARL V. JENSEN, a citizen of the United States, residing at Manistee, in the county of Manistee and State of Michigan, have invented certain new and useful Improvements in Chucks; and I do hereby declare the following to be a full, clear, and exact description of the invention, such as will enable others skilled in the art to which it appertains to make and use the same.

This invention relates to improvements in chucks and more particularly to such as are adaptable to ratchet drills,—the object of the invention being to provide simple and efficient means whereby a drill having a grooved or split shank may be firmly secured in the chuck.

With this and other objects in view, the invention consists in certain novel features of construction and combinations of parts as hereinafter set forth and pointed out in the claims.

In the accompanying drawings, Figure 1 is a sectional view of a ratchet drill embodying our improvements; Fig. 2 is an end view of the chuck portion of the drill, with the jaws removed. Fig. 3 is a detail view of one of the jaws; Fig. 4 is a view showing the two jaws and the spring which connects them; and Fig. 5 is a detail view of the spring.

1 represents the head of a ratchet drill and is provided with a suitable handle 2. A chuck barrel 3 is revolubly mounted in the head and provided with an annular series of ratchet teeth 4 to be engaged by a spring-pressed dog 5 mounted in the drill head.

The chuck barrel 3 is provided at one end with an annular flange 6 disposed adjacent to bottom of the head 1, and said barrel is provided with a shank 7 projecting above the head 1. A portion of this shank is threaded externally, as at 8, for the reception of a nut or ring 9 which overhangs the top of the head 1 in close proximity thereto. The shank 7 is also made with a threaded socket 10 to receive a feed screw or post 11.

The chuck barrel 3 is made with a large socket 12 for the accommodation of chuck jaws 13 and the wall of said socket is threaded to receive an adjusting sleeve or nut 14 having a smooth tapering bore for moving the jaws, as hereinafter explained.

Each jaw 13 is somewhat tapering and is triangular in cross-section,—the outer face of the jaw being convex to bear against the smooth inner face of the adjusting sleeve or nut 14. The jaws are disposed diametrically opposite each other and are provided in their base portions with transverse slots 15 which receive lugs or pins 16 projecting from the base of the socket 12 for the purpose of guiding said jaws in their radial movements and also to prevent them from rotary movement independently of the chuck barrel.

The chuck jaws 13 are provided in their outer faces near their base portions with grooves 17 for the accommodation of a spring 18,—the latter having a general circular form and being secured to each of the jaws in such manner as to normally tend to move said jaws outwardly. The spring 18 may be made of a single piece of spring wire bent into general circular shape, the free ends of the wire being provided with short projections 19 inserted into sockets in one of the jaws, and said wire spring being bent intermediate of its ends in a manner to form a short projection 20 which enters a socket in the other jaw.

My improvements are particularly adaptable for drills having split or grooved shanks, such a drill being illustrated at 21 with its shank portion having longitudinal grooves 22. The drill will be placed in the socket of the chuck barrel in such manner that the grooves 22 will be opposite the triangular jaws. It will be apparent that by now rotating the adjusting sleeve or nut 14, in one direction, the coaction of the tapering bore of said sleeve or nut with the jaws, will cause the latter to approach the drill shank, enter the split or grooved portions thereof, and securely clamp the drill in the chuck barrel. By rotating the adjusting sleeve or nut 14 in the reverse direction, the spring 18 will be permitted to move the jaws outwardly and thus release the drill.

My improvements are very simple in construction; are particularly adaptable to ratchet drills; will enable the use of any split or grooved shank drill whether the same be long or short, and will operate to hold the drill firmly in the chuck barrel.

Having fully described my invention what I claim as new and desire to secure by Letters-Patent, is:—

1. The combination of a barrel provided in its bottom with lugs, jaws mounted within said barrel and having transverse grooves in their butt ends to receive said lugs, a threaded sleeve entering said barrel and having a conical inner wall to engage said jaws, and a spring connected with said jaws and tending to move them away from each other.

2. The combination with a chuck barrel having a threaded socket, and lugs projecting from the base of said socket, of triangular jaws disposed in said socket and having transverse base grooves to receive said lugs, a threaded sleeve entering said socket and having a tapering bore receiving said jaws, and a spring secured to said jaws and tending to move them outwardly.

3. The combination with a chuck barrel having a threaded socket and lugs projecting from the base of said socket, of triangular jaws disposed in said socket, said jaws having transverse base grooves receiving said lugs, and also having grooves in their outer faces, a spring embracing the jaws and seated in said last mentioned grooves, said spring having projections entering sockets in the jaws, and a threaded sleeve entering the threaded socket in the barrel and having a tapering bore receiving the jaws.

In testimony whereof, I have signed this specification in the presence of two subscribing witnesses.

KARL V. JENSEN.

Witnesses:
HERBERT K. RANDALL,
STACY C. THOMPSON.

Copies of this patent may be obtained for five cents each, by addressing the "Commissioner of Patents. Washington, D. C."